Nov. 29, 1960     F. H. FIELD ET AL     2,962,588
ANALYSIS METHOD
Filed Dec. 7, 1956
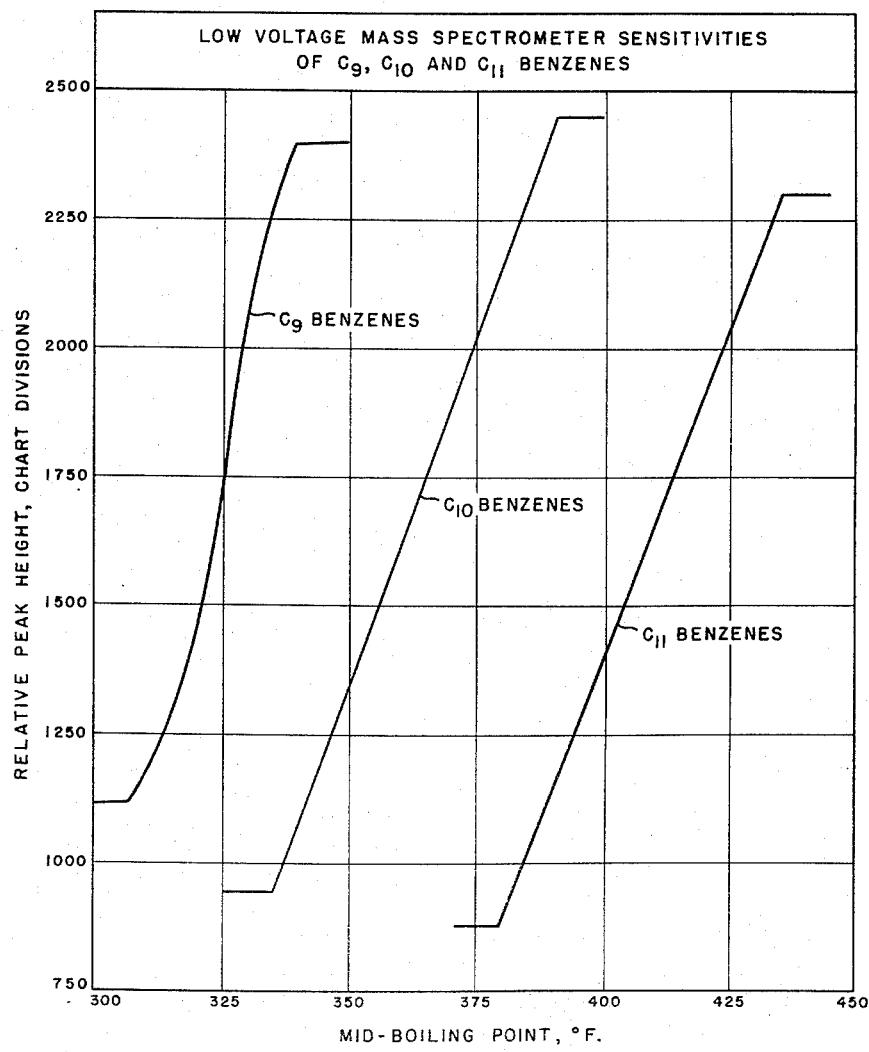
INVENTORS.
Frank H. Field,
Sam H. Hastings,
BY
ATTORNEY.

United States Patent Office 2,962,588
Patented Nov. 29, 1960

2,962,588
ANALYSIS METHOD

Frank H. Field and Sam H. Hastings, Baytown, Tex., assignors, by mesne assignments, to Esso Research and Engineering Company, Elizabeth, N.J., a corporation of Delaware Filed Dec. 7, 1956, Ser. No. 626,887

7 Claims. (Cl. 250—41.9)

This invention relates to a method for quantitatively and qualitatively determining unsaturated non-gaseous hydrocarbons in a sample comprising a plurality of such unsaturated hydrocarbons. More particularly, this invention relates to a mass spectrometric analysis method for the determination of unsaturated hydrocarbons in a sample comprising a plurality of such unsaturated hydrocarbons.

In the treatment of petroleum hydrocarbon fractions such as naphtha fractions, gas oil fractions, residual fractions, and in the treatment of components of such fractions, it is frequently desirable to qualitatively and, in many instances, quantitatively identify the unsaturated hydrocarbons that are present in such samples.

This is accomplished in accordance with the present invention by ionizing a sample comprising a plurality of non-gaseous unsaturated hydrocarbons in a mass spectrometer at an absolute ionizing voltage within the range of about 9 to 11 volts to obtain a mass spectrum directly qualitatively identifying the unsaturated hydrocarbon compound types in the sample.

The "Absolute Ionizing" voltage mentioned above is to be distinguished from the "Applied Ionizing" voltage in that the absolute ionizing voltage is dependent not only upon the applied ionizing voltage but is also dependent upon energy contributions derived from a plurality of sources including, for example, energy contributions from the ion drawout electrode, thermal energy derived from the electron emitting filament, etc. The applied ionizing voltage to be employed in obtaining an absolute ionizing voltage within the range of about 9 to 11 volts will vary from instrument to instrument but, in general, will be within the range of about 5 to 8 volts.

It has been discovered that when a hydrocarbon sample comprising a plurality of non-gaseous unsaturated hydrocarbons is ionized in a mass spectrometer at an absolute ionizing voltage of about 9 to 11 volts, the mass spectrum that is obtained will consist essentially of a spectrum of parent ions of the unsaturated hydrocarbons. Saturated and naphthenic hydrocarbons in the sample will be ionized, if at all, to only a negligible extent which will not influence results obtained with respect to the unsaturated components of the sample.

When it is desired to obtain a quantitative determination of the unsaturated hydrocarbon compound types, the inherent instability of mass spectrometers at the low ionizing voltages of the present invention may be compensated for by first ionizing a reference sample containing a known quantity of an unsaturated hydrocarbon, next subjecting the unknown sample to mass spectroscopic analysis at the said conditions and then again subjecting the reference sample to mass spectroscopic analysis.

The results from the initial and terminal runs from the reference sample may then be averaged and the thus determined average sensitivity correlated with an arbitrarily selected standardized sensitivity.

For example, if the reference sample consists of 2,4,4-trimethylpentene-1, a compound having an intensity (based on chart divisions) within the range of about 350 to 650, the average intensity of the 2,4,4-trimethylpentene-1 reference sample at the time of analysis may be corrected to an arbitrarily assumed intensity of 500 chart divisions. The observed intensity for unsaturated hydrocarbon components of the reference sample may then be multiplied by the ratio of the average observed sensitivity for the reference sample to the standard sensitivity for the reference sample to thereby convert the observed intensity for the unsaturated components of the sample to a standardized intensity.

An analysis of a sample containing a known quantity of the unsaturated component conducted in the described manner may be employed to obtain the standardized intensity for the known quantity of the unsaturated component. The ratio of the standardized intensity for the unknown component to the standardized intensity obtained with a known quantity of the component may then be utilized to compute directly the percentage of the unsaturated component in the unknown sample.

The known samples utilized to determine the standardized intensity of unsaturated hydrocarbon compound types may consist of pure unsaturated compounds or mixtures of isometric unsaturated hydrocarbons of the same molecular weight.

When a mixture of isomers is to be employed, the isomers should be mixed in approximately the proportions in which they will normally occur in equilibrium in the sample under consideration.

If a non-equilibrium mixture of isomers is to be utilized, it has been discovered in accordance with the present invention that the standardized intensity for the mixture may still be determined. Thus, individual pure isomers are analyzed and the standardized intensity of each isomer is determined. A graph of standardized intensity relative to the boiling points of the isomers is then prepared. The standardized intensity value for a non-equilibrium mixture of isomers may thereafter be determined by measuring the mid-boiling point of the mixture and utilizing the intensity indicated by the graph for the mid-boiling point.

This is illustrated, for example, by the attached drawing which is a graph of the relative peak height (standardized intensity) of isomeric $C_9$ benzenes, isomeric $C_{10}$ benzenes, and isomeric $C_{11}$ benzenes against boiling point. If, for instance, a $C_{10}$ benzene fraction containing a non-equilibrium mixture of $C_{10}$ benzenes is to be analyzed, the mid-boiling point of the sample is determined and the standardized intensity to be employed is read from the chart. Thus, if the sample is found to have a mid-boiling point of about 375° F., a standardized intensity of about 2000 chart divisions would be employed.

The invention will be further illustrated by the following specific examples which are given by way of illustration and which are not intended as limitations on the scope of the invention.

In conducting the experiments hereinafter reported, a commercially available mass spectrometer of the Westinghouse type LV was employed. Ion currents were detected with a commercially available strip chart recording electrometer having a sensitivity of about $1 \times 10^{-15}$ amp./chart division. Magnetic scanning was employed. As a result of preliminary work it was determined that intensity maximizing conditions for this mass spectrometer included an ionizing electron current of 9.5 $\mu$ amp. and an ion drawout potential (pusher potential) of 1.9 volts. An applied ionizing voltage of 6.90 volts was employed, such applied ionizing voltage being sufficient to provide an absolute ionizing voltage substantially equal to about 10 volts. No attempt was made to control ion source temperature (which varied between about 175° and 200° C.) since substantially only molecule ions are formed in accordance with the present invention (temperature control, therefore, is not an important factor as in the case of the conventional high voltage mass spectrometer wherein ion fragmentation occurs and must be compensated for). An unmeasured substantially constant volume of sample was employed for each analysis. However, the volume of a sample employed was maximized (i.e., was as large as possible and still compatible with respect to the linearity that should exist between ion intensity and sample volume). The positioning of the electron beam collimating magnet was found to be an important variable in that minor changes in position were found to effect a 2 or 3 fold change in ion current magnitude without bringing about any perceptible change in the ratio of collected current to emitted electron current. As a consequence, the collimating magnet was adjusted so as to give the largest possible ion current consistent with the maintenance of a satisfactory ratio of collected to emitted electron current. The just-described operating conditions are hereinafter referred to as "Standardized Operating Conditions."

EXAMPLE I

A variety of substantially pure samples of aromatic, olefinic, cycloolefinic and diolefinic hydrocarbons were analyzed under the above-described Standardized Operating Conditions to determine the ion intensities of such compounds. The results are set forth in Table I.

As will be observed from Table I, satisfactory intensities were obtainable with analyses conducted under the Standard Operating Conditions.

EXAMPLE II

A plurality of substantially pure naphthenic hydrocarbon samples were analyzed under the Standardized Operating Conditions mentioned above to determine the ion intensities for the samples, the results being set forth in Table II.

*Table II*

MOLECULE-ION INTENSITIES OF VARIOUS NAPHTHENE HYDROCARBONS

| | Compound | Obs. Intensity [1] |
|---|---|---|
| $C_5$ | Cyclopentane | 2 |
| $C_6$ | Cyclohexane | 24 |
| | Me-Cyclopentane | 5 |
| $C_7$ | Me-Cyclohexane | 31 |
| | 1,1-Me$_2$Cyclopentane | 5 |
| | t-1,2-Me$_2$Cyclopentane | 12 |
| | t-1,2-Me$_2$Cyclohexane | 43 |
| $C_8$ | 1,1-Me$_2$Cyclohexane | 29 |
| | 1,1,2-Me$_3$Cyclopentane | 16 |
| | C,C,C-1,2,3-Me$_3$Cyclopentane | 24 |
| | 1,1,3-Me$_3$Cyclohexane | 20 |
| $C_9$ | n-Bu-Cyclopentane | 23 |
| $C_{10}$ | t-Bu-Cyclohexane | 15 |

[1] Intensities expressed as chart divisions (1 chart division = $1 \times 10^{-15}$ amp. ion current).

From Table II it will be observed that the intensity for naphthenic hydrocarbons under the mass spectroscopic analysis conditions of the present invention is substantially negligible as compared with the intensities obtainable with respect to unsaturated hydrocarbons. That is to say, Table II shows that naphthenic hydrocarbons are substantially unaffected by the mass spectroscopic analysis conditions of the present invention.

EXAMPLE III

A plurality of samples of toluene and n-heptane were prepared and analyzed under the Standardized Operating Conditions set forth above. The samples prepared and

*Table I*

MOLECULE-ION INTENSITIES OF VARIOUS HYDROCARBONS

| Compound | Obs. Intensity [1] | Compound | Obs. Intensity [1] |
|---|---|---|---|
| Aromatics: | | Cyclic Olefins: | |
| $C_6H_6$ | 1,050 | 3 or 4-MeCyC$_5$= | 396 |
| $C_7H_8$ | 1,620 | CyC$_6$= | 868 |
| o-C$_6$H$_4$(CH$_3$)$_2$ | 1,890 | 2,4-Me$_2$CyC$_5$= | 1,330 |
| 1,2,3-C$_6$H$_3$(CH$_3$)$_3$ | 2,130 | 1-MeCyC$_6$= | 1,380 |
| 1,3-C$_6$H$_4$(C$_2$H$_5$)$_2$ | 1,250 | 4-MeCyC$_6$= | 723 |
| Average | 1,588 | Average | 940 |
| Olefins: | | Diolefins: | |
| 2-MeC$_4$=−2 | 1,000 | 1,2-C$_5$H$_8$ | 387 |
| C$_6$H$_{12}$−1 | 220 | 1-t-3-C$_5$H$_8$ | 2,360 |
| C$_6$H$_{12}$−2 | 335 | 1,4-C$_5$H$_8$ | 165 |
| 2,3-Me$_2$C$_4$=−2 | 1,830 | 2-Me-1,3-C$_4$= | 1,740 |
| C$_7$H$_{14}$−1 | 157 | 1,5-C$_6$H$_{10}$ | 0 |
| C$_7$H$_{14}$−2 | 96 | 2,3-Me$_2$-1,3-C$_4$= | 1,880 |
| 2-MeC$_6$=−2 | 800 | | |
| C$_8$H$_{16}$−1 | 95 | Average | 1,089 |
| 2,3-Me$_2$C$_6$=−2 | 1,480 | | |
| 2,4,4-Me$_3$C$_5$=−1 | 488 | | |
| C$_9$H$_{20}$−1 | 95 | | |
| C$_{10}$H$_{22}$−1 | 79 | | |
| Average | 556 | | |

[1] Intensities expressed as chart divisions (1 chart division = $1 \times 10^{-15}$ amp. ion current).

the results obtained are set forth in Table III which follows:

Table III
QUANTITATIVE ANALYSES OF TOLUENE-N-HEPTANE SYNTHETIC BINARIES

| Percent Toluene in Sample | Mass 92 Peak Height (Chart Divisions) | Percent Toluene (MS) | Percent Deviation |
|---|---|---|---|
| 100 | 2,450 | | |
| 80 | 1,940 | 79.2 | −1.0 |
| 60 | 1,490 | 60.8 | +1.3 |
| 40 | 960 | 39.2 | −2.0 |
| 20 | 491 | 20.0 | 0 |
| Average | | | 1.1 |

From Table III it will be observed that an accurate mass spectroscopic analysis was obtained in each instance although the percentage of toluene in the samples varied widely and a saturated hydrocarbon was present. That is to say, since n-heptane is a typical saturated hydrocarbon, Table III shows that saturated hydrocarbons are substantially unaffected by the mass spectrometric analysis conditions of the present invention.

EXAMPLE IV

A synthetic blend of known quantities of 2,3-dimethyl butene-2, 2-methylhexene-2, 2,3-dimethylhexene-2, isooctane and methylcyclohexane was prepared and analyzed under the Standard Operating Conditions set forth above. The composition of the blend and the results obtained are set forth in Table IV.

Table IV
QUANTITATIVE ANALYSES OF OLEFIN SYNTHETIC BLENDS

| Compound | Percent in Sample | Percent (MS) | Percent Deviation |
|---|---|---|---|
| 2,3-Me$_2$C$_4$=−2 | 16.7 | 15.3 | −8.4 |
| 2-MeC$_6$=−2 | 16.7 | 19.3 | +9.6 |
| 2,3-Me$_2$C$_6$=−2 | 16.7 | 16.8 | +0.6 |
| Isooctane | 25.0 | | |
| Methyl Cyclohexane | 25.0 | | |
| | | Sum 51.4 | Average 6.2 |

It will be noted from Table IV that an accurate analysis was obtained with respect to the unsaturated components of the blend and that the saturated and naphthenic hydrocarbon components of the blend were not ionized under the standardized ionizing conditions employed.

EXAMPLE V

As a further illustration of the accuracy of analyses conducted in accordance with the present invention, samples of hydrocarbon naphthas obtained by the catalytic cracking of a petroleum hydrocarbon feed stock were analyzed under the Standardized Operating Conditions set forth above. Fluorescent indicator adsorption (FIA) analyses were also conducted. The results are set forth in Table V:

From Table V it will be observed that the analysis method of the present invention corresponds excellently with the FIA analysis.

EXAMPLE VI

A petroleum hydrocarbon naphtha fraction obtained from the catalytic cracking of a high sulfur content gas oil was subjected to a detailed analysis study including analysis by means of distillation, percolation of the distillate fractions, recombination of concentrates, hydrogenation and further distillation and subsequent high voltage mass spectrometer and infrared analyses on the segregated fractions. The study involved more than about 500 manhours of labor.

A detailed composition analysis of the same material was then conducted in accordance with the present invention utilizing the Standardized Operating Conditions described above.

A detailed analysis was obtained with a total of about 1.5 manhours of labor, only about 40 minutes of which were consumed in actual instrument scanning time.

The results obtained are set forth in Table VI.

Table VI
ANALYSIS OF CATALYTIC NAPTHA FROM HIGH SULFUR GAS OIL BY LOW VOLTAGE MASS SPECTROMETRY

| Component | Liquid Volume, Percent | |
|---|---|---|
| | Low Voltage MS | Detailed Composition Study |
| Benzene | 0.3 | 0.4 |
| Toluene | 1.6 | 1.7 |
| C$_8$ Benzenes | 3.3 | 2.9 |
| C$_9$ Benzenes | 3.9 | 3.8 |
| C$_{10}$ Benzenes | 2.7 | 2.6 |
| C$_{11}$ Benzenes | 2.2 | [1] 2.9 |
| Indane | 0.2 | 0.3 |
| Methylindanes | 1.1 | 1.4 |
| Dimethylindanes | 0.9 | ([1]) |
| Naphthalene | | 0.2 |
| Acyclic Olefins: | | |
| C$_5$ | 15.9 | 12.3 |
| C$_6$ | 10.2 | 10.5 |
| C$_7$ | 7.2 | 7.3 |
| C$_8$ | 5.6 | 5.5 |
| C$_9$ | 3.6 | |
| C$_{10}$ | 2.7 | [2] 10.5 |
| C$_{11}$ | 1.5 | |
| C$_{12}$ | 1.1 | |
| Cyclic Olefins: | | |
| C$_5$ | 1.3 | 0.5 |
| C$_6$ | 3.9 | 2.5 |
| C$_7$ | 4.4 | 4.7 |
| C$_8$ | 3.6 | 4.3 |
| C$_9$ | 2.3 | |
| C$_{10}$ | 1.2 | |
| C$_{16}$ | 0.4 | [3] 7.2 |
| C$_{12}$ | 0.4 | |
| Total Unsaturates | 81.5 | 81.5 |

[1] Includes dimethylindanes.
[2] C$_9$ to C$_{12}$ acyclic olefins.
[3] C$_9$ to C$_{12}$ cyclic olefins.

From the results set forth in Table VI it will be seen that an accurate and detailed analysis was obtained in accordance with the present invention which compares

Table V
PRECISION OF MS AND FIA METHODS FOR TOTAL OLEFINS AND TOTAL AROMATICS
[Liquid volume percent]

| | Total Olefins | | | | | Total Aromatics | | | | |
|---|---|---|---|---|---|---|---|---|---|---|
| | FIA | | MS | | | FIA | | MS | | |
| Run | 1 | 2 | 1 | 2 | 3 | 1 | 2 | 1 | 2 | 3 |
| Sample: | | | | | | | | | | |
| Light Naphtha-Cat Cracker #1 | 60.0 | 59.0 | 59.7 | 56.8 | 57.2 | 11.0 | 12.2 | 11.4 | 11.9 | 11.4 |
| Heavy Naphtha-Cat Cracker #1 | 30.1 | 28.8 | 27.6 | 26.9 | 24.7 | 46.5 | 47.4 | 45.8 | 49.4 | 46.2 |
| Light Naphtha-Cat Cracker #2 | 55.8 | 56.0 | 54.0 | 51.8 | 54.3 | 12.2 | 12.6 | 12.3 | 11.3 | 13.1 |
| Heavy Naphtha-Cat Cracker #2 | 26.3 | 25.7 | 25.6 | 25.6 | 23.7 | 47.0 | 47.0 | 47.9 | 47.6 | 47.4 | almost directly with the laborious detailed composition study which was made to obtain comparative findings.

EXAMPLE VII

Samples of two catalytic naphthas obtained by the catalytic cracking of petroleum hydrocarbon gas oil fractions were qualitatively analyzed utilizing the Standardized Operating Conditions described above. The qualitative results thus obtained are set forth in Table VII:

*Table VII*

QUALITATIVE LOW VOLTAGE MASS SPECTRA OF CATALYTIC NAPHTHAS (IBP-430° F.)

| Mass | Type | Sample No. 1 [1] | Sample No. 2 [1] |
|---|---|---|---|
| $C_5$: | | | |
| 66 | | | |
| 68 | C | 3.3 | 5.8 |
| 70 | B | 294 | 56 |
| $C_6$: | | | |
| 78 | A | 4.5 | 5.5 |
| 80 | D | 1.0 | 3.2 |
| 82 | C | 9.9 | 27.0 |
| 84 | B | 240 | 54 |
| $C_7$: | | | |
| 92 | A | 6.2 | 16.9 |
| 94 | D | 2.1 | 7.8 |
| 96 | C | 15.4 | 40 |
| 98 | B | 51 | 39 |
| $C_8$: | | | |
| 106 | A | 17.5 | 45 |
| 108 | D | 1.0 | 6.8 |
| 110 | C | 11.6 | 34 |
| 112 | B | 17.1 | 34 |
| $C_9$: | | | |
| 120 | A | 28.1 | 68 |
| 122 | D | 0.7 | 3.6 |
| 124 | C | 7.2 | 19.8 |
| 126 | B | 11.6 | 27.3 |
| $C_{10}$: | | | |
| 134 | A | 16.4 | 50 |
| 136 | D | | 1.3 |
| 138 | C | 2.6 | 11.7 |
| 140 | B | 4.5 | 21.4 |
| $C_{11}$: | | | |
| 148 | A | 5.5 | 24.0 |
| 150 | D | | 0.7 |
| 152 | C | 1.2 | 7.1 |
| 154 | B | 3.4 | 15.6 |
| $C_{12}$: | | | |
| 162 | A | 1.4 | 6.8 |
| 164 | D | | 0.7 |
| 166 | C | | 4.5 |
| 168 | B | 2.1 | 8.8 |

[1] *Chart Divisions:* Type A—Aromatics. Type B—Acyclic olefins. Type C—Cyclic olefins+diolefins. Type D—Cyclic diolefins+dicyclic olefins.

From Table VII it is seen that in each instance a qualitative detailed determination of the unsaturated compound types present in the samples was obtained with ease.

What is claimed is:

1. A method comprising the steps of causing a sample comprising a plurality of non-gaseous unsaturated hydrocarbons to be ionized in a mass spectrometer at an absolute ionizing voltage within the range of about 9 to 11 volts to thereby selectively ionize said unsaturated hydrocarbons and detecting the thus formed unsaturated hydrocarbon ions.

2. A method comprising the steps of causing a sample comprising a plurality of non-gaseous unsaturated hydrocarbons to be ionized in a mass spectrometer at an absolute ionizing voltage within the range of about 9 to 11 volts to thereby selectively ionize said unsaturated hydrocarbons and measuring the amount of the thus formed unsaturated hydrocarbon ions.

3. In the analysis of a sample containing an unknown quantity of a plurality of non-gaseous unsaturated hydrocarbons involving the comparison of measurements of the quantities of ions of predetermined mass-to-charge ratios formed in a mass spectrometer from said sample with measurements obtained by ionizing reference samples containing known quantities of said unsaturated hydrocarbons, the improvement which comprises causing to be ionized said known and reference samples at an absolute ionizing voltage within the range of about 9 to 11 volts to thereby selectively ionize said unsaturated hydrocarbons and to thereby provide a basis for algebraically determining the quantities of said unsaturated hydrocarbons in said unknown sample.

4. In the analysis of an unknown sample containing an unknown quantity of non-gaseous unsaturated hydrocarbon components to obtain ion measurements for the algebraic determination of the quantities of said unsaturated hydroacrbons in said sample, the improvement which comprises sequentially causing to be ionized at an absolute ionizing voltage within the range of about 9 to 11 volts a reference sample containing a known quantity of a non-gaseous hydrocarbon, said unknown sample and the said reference sample to thereby selectively ionize said unsaturated hydrocarbon components, measuring the quantities of ions formed by analysis of the said samples, averaging the measured quantities for the initial and terminal analyses of the reference sample, and determining the ratio of the said average to the measured unsaturated ions for the unknown sample.

5. A method comprising the steps of causing a sample comprising a plurality of non-gaseous unsaturated hydrocarbons of a plurality of compound types to be ionized in a mass spectrometer at an absolute ionizing voltage within the range of about 9 to 11 volts to thereby selectively ionize said unsaturated hydrocarbon ions and detecting the thus formed unsaturated hydrocarbon ions.

6. In the analysis of a sample containing an unknown quantity of a plurality of non-gaseous unsaturated hydrocarbons of a plurality of compound types involving the comparison of measurements of the quantities of ions of predetermined mass-to-charge ratios formed in a mass spectrometer from said sample with measurements obtained by ionizing reference samples containing known quantities of said unsaturated hydrocarbons, the improvement which comprises causing to be ionized said known and reference samples at an absolute ionizing voltage within the range of about 9 to 11 volts to thereby selectively ionize said unsaturated hydrocarbons and to thereby provide a basis for algebraically determining the quantities of said unsaturated hydrocarbons in said unknown sample.

7. In the analysis of an unknown sample containing an unknown quantity of non-gaseous unsaturated hydrocarbon components of a plurality of compound types to obtain ion measurements for the algebraic determination of the quantities of said unsaturated hydrocarbons in said sample, the improvement which comprises sequentially causing to be ionized at an absolute ionizing voltage within the range of about 9 to 11 volts a first portion of a reference sample containing a known quantity of a non-gaseous hydrocarbon, said unknown sample, and a second portion of the said reference sample to thereby selectively ionize said unsaturated hydrocarbon components, measuring the quantities of ions formed by analysis of the said samples, averaging the measured quantities for the initial and terminal analyses of the reference sample, and determining the ratio of the said average to the measured unsaturated ions for the unknown sample.

References Cited in the file of this patent

UNITED STATES PATENTS

| | | |
|---|---|---|
| 2,761,975 | Weisz | Sept. 4, 1956 |
| 2,768,301 | Bennett | Oct. 23, 1956 |

OTHER REFERENCES

Willard et al.: Industrial Methods of Analysis, 2nd edition, Van Nostrand Company, 1951, pages 166 to 174, page 168 relied on.

Aromatic Molecular Weight Distribution and Total Aromatic Content, by Lumpkin and Thomas; from Analytical Chemistry, vol. 23, No. 12, December 1951; pages 1738 to 1740.